L. HOFMEISTER.
FLAT TIRE ALARM.
APPLICATION FILED OCT. 18, 1918.
1,333,076.
Patented Mar. 9, 1920.
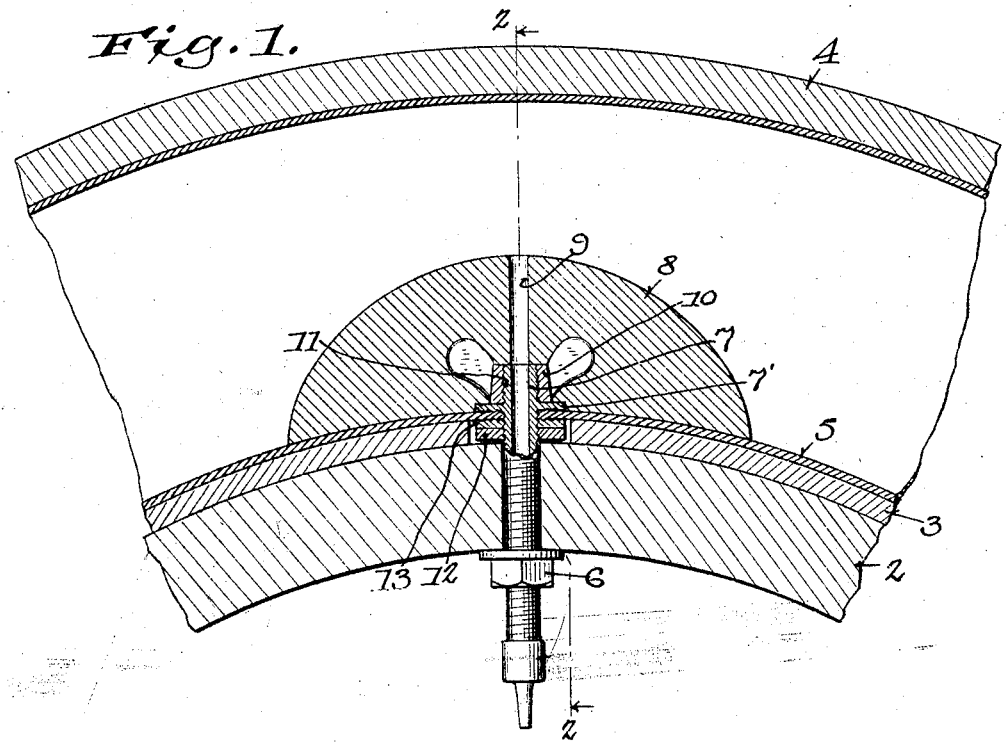
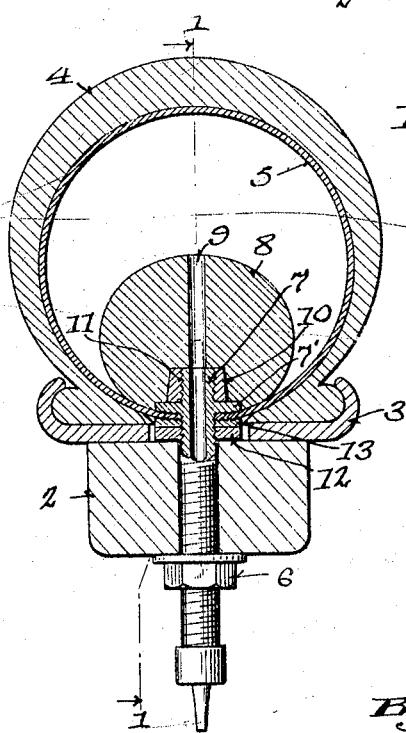
Inventor
Leo Hofmeister
By Worsell, Kenney & French
Attorneys

UNITED STATES PATENT OFFICE.

LEO HOFMEISTER, OF MILWAUKEE, WISCONSIN.

FLAT-TIRE ALARM.

1,333,076.

Specification of Letters Patent.

Patented Mar. 9, 1920.

Application filed October 18, 1918. Serial No. 258,723.

*To all whom it may concern:*

Be it known that I, LEO HOFMEISTER, a citizen of the United States, and resident of Milwaukee, in the county of Milwaukee and State of Wisconsin, have invented new and useful Improvements in Flat-Tire Alarms, of which the following is a description, reference being had to the accompanying drawings, which are a part of this specification.

The invention relates to automobile tires and more particularly to a device which will indicate to the driver of the automobile that the tire is leaking or becoming deflated and is fully described and explained in the specification and shown in the accompanying drawings in which:

Figure 1 is a vertical sectional view through a tire equipped with the device embodying the invention; and Fig. 2 is a section taken on the line 2—2 of Fig. 1.

In the drawings, the numeral 2 designates the felly, 3 the wheel rim, 4 the outer casing, 5 the inner tube and 6 the valve having a threaded end 7 and an annular flange 7'.

A spherically convex block 8 of rubber or other yielding material provided with a central aperture 9 is affixed to the threaded end 7 of the valve by means of a wing nut 10 embedded in said block and having its threaded bore 11 secured upon the end 7 of said valve, the aperture 9 being in line with the valve tube. The valve 6 carries a nut 12 and is secured to the tube by clamping the tube 5 adjacent to the stem between the flange 7' and the nut 12, a washer 13 being interposed between the nut 12 and the tube 5.

With this construction the inner tube is blown up in the usual manner, the air passing through the valve stem and aperture 9 into the tube. If for any reason the valve or tube should leak the partial deflation of the tire will cause it to strike the bump or block 8 as it turns around and this continued bumping will be noticed and heard by the operator of the vehicle who is thereby warned of the condition of the tire so that he may blow it up or repair it before serious damage is done to the tire by riding upon it. In brief the rubber bump serves as a silent sentinel to warn the operator of the flattened condition of the tire, and does not interfere with the normal operation of the tire.

The block 8 may be attached to any point on the inner side of the inner tube but I prefer to attach it to the tube by the same means employed to secure the valve to the tube as it is more convenient and as a good support is provided.

What I claim as my invention is:

1. A device of the class described comprising a valve stem, a valve stem securing nut, and a bumper block rigidly secured to said valve stem securing nut, said bumper block forming a bump on a tire when the tire is partially deflated.

2. In a pneumatic flat tire alarm, an inner tube, an inflating valve therefor including a threaded end passed into the interior of said tube, a winged nut engaging the threaded end of said valve disposed in the tube to secure the valve thereto, and a rubber bumping block disposed in said tube and covering said winged nut and the portion of the valve disposed in the tube, said bumping block being rigidly secured to said winged nut.

3. In an automobile tire, the combination with an inner tube and its inflating valve projecting therein, of means for indicating the inflation of said tube consisting of a rubber block surrounding the portion of said valve projecting in said tube, an air inlet passageway in said block and registering with the passageway of said valve, and means for securing said valve to the tube, said means being embedded in said block to secure the same in the tube.

In testimony whereof I affix my signature.

LEO HOFMEISTER.